(12) United States Patent
Gratzl

(10) Patent No.: US 11,110,747 B2
(45) Date of Patent: Sep. 7, 2021

(54) AXLE BEAM FOR A COMMERCIAL VEHICLE, AND PRODUCTION METHOD THEREFOR

(71) Applicant: MAN Truck & Bus AG, Munich (DE)

(72) Inventor: Roland Gratzl, Munich (DE)

(73) Assignee: MAN TRUCK & BUS AG, Munich (DE)

( * ) Notice: Subject to any disclaimer, the term of this patent is extended or adjusted under 35 U.S.C. 154(b) by 421 days.

(21) Appl. No.: 16/005,141

(22) Filed: Jun. 11, 2018

(65) Prior Publication Data

US 2018/0354302 A1    Dec. 13, 2018

(30) Foreign Application Priority Data

Jun. 12, 2017   (DE) .......................... 102017112841.7

(51) Int. Cl.
| | |
|---|---|
| *B60B 35/16* | (2006.01) |
| *B23P 11/00* | (2006.01) |
| *B32B 15/01* | (2006.01) |
| *B60B 35/00* | (2006.01) |
| *B60B 35/14* | (2006.01) |

(Continued)

(52) U.S. Cl.
CPC ............ *B60B 35/166* (2013.01); *B23P 11/00* (2013.01); *B32B 15/01* (2013.01); *B60B 35/006* (2013.01); *B60B 35/14* (2013.01); *B23P 2700/50* (2013.01); *B32B 1/08* (2013.01); *B32B 2605/00* (2013.01); *B60B 35/08* (2013.01); *B60B 35/163* (2013.01); *B60B 2310/30* (2013.01); *B60B 2900/311* (2013.01); *B60B 2900/711* (2013.01); *B60Y 2200/14* (2013.01)

(58) Field of Classification Search
CPC ..... B60B 35/004; B60B 35/006; B60B 35/02; B60B 35/04; B60B 35/08; B60B 35/16; B60B 35/166
See application file for complete search history.

(56) References Cited

U.S. PATENT DOCUMENTS

| | | |
|---|---|---|
| 1,209,134 A | 12/1916 | Dodge |
| 1,403,500 A | 1/1922 | Huff |
| 2,569,452 A | 10/1951 | Buckendale |

(Continued)

FOREIGN PATENT DOCUMENTS

| | | |
|---|---|---|
| DE | 20119640 U1 | 2/2002 |
| DE | 102006017421 A1 | 8/2007 |

OTHER PUBLICATIONS

Machine translation of DE 102006017421, 19 pages (Year: 2007).*

*Primary Examiner* — Jason R Bellinger
(74) *Attorney, Agent, or Firm* — Weber Rosselli & Cannon LLP

(57) ABSTRACT

The present disclosure relates to an axle beam, in particular an axle bridge, for a motor vehicle, preferably a commercial vehicle. The axle beam has a first axle beam shell and a second axle beam shell which is connected, in particular welded, to the first axle beam shell in order to configure a tubular body. The tubular body has an inner circumferential face with a plurality of flat sections which form a non-round cross section of the tubular body. The axle beam has a reinforcing component which has a non-round cross section, is arranged within the tubular body, and bears at least partially against the flat sections of the inner circumferential face of the tubular body.

16 Claims, 5 Drawing Sheets

(51) Int. Cl.
  *B32B 1/08*   (2006.01)
  *B60B 35/08*  (2006.01)

(56) References Cited

U.S. PATENT DOCUMENTS

| | | | |
|---|---|---|---|
| 5,297,855 A * | 3/1994 | Jeng | B60B 35/16 |
| | | | 301/124.1 |
| 5,855,416 A | 1/1999 | Tasker et al. | |
| 6,609,649 B1 * | 8/2003 | Barnholt | B21D 53/90 |
| | | | 228/171 |
| 7,260,879 B2 | 8/2007 | Koschinat | |
| 2002/0163174 A1 | 11/2002 | Bell et al. | |
| 2004/0256825 A1 | 12/2004 | Chalin et al. | |
| 2005/0168057 A1 * | 8/2005 | Eschenburg | B60B 35/006 |
| | | | 301/137 |
| 2007/0132307 A1 * | 6/2007 | Fahrentholz | B60B 35/16 |
| | | | 301/137 |
| 2008/0001379 A1 | 1/2008 | Myers et al. | |

* cited by examiner

AXLE BEAM FOR A COMMERCIAL VEHICLE, AND PRODUCTION METHOD THEREFOR

BACKGROUND

The present disclosure relates to an axle beam of a motor vehicle, in particular of a commercial vehicle, and to a method for producing an axle beam.

Axle beams of a motor vehicle have to be connected to a chassis of the motor vehicle. For chassis attachment, brackets can be welded to the axle beam, for example, via fillet welds. As an alternative or in addition, it is possible to weld metal strips onto the axle beam for positively locking chassis attachment. Here, tack points which are produced, for example, by way of a fusion welding method can connect the metal strips and the axle beam. Subsequently, the metal strips can be milled off, in order to ensure a defined width of the cross section for the positively locking mounting of the chassis attachment.

The known methods which comprise welding on of brackets and/or metal strips can be disadvantageous.

Both the fillet welds of the brackets which are welded on and the metal strips which are attached by means of tack welding reduce the load-bearing capability of the basic material in the load-bearing cross section. This weakening occurs, in particular, in the highly loaded edge zone of the outer contour. The weakening also occurs in the case of a theoretically fault-free weld, for example by way of internal stresses on account of the input of heat.

In addition, variations in rigidity can occur in the edge region of brackets, on U-bolts, clamping plates and chassis attachments. This can lead to high local loads in the axle beam.

Downward clamping of the axle cross section for the assembly of the chassis attachment by means of U-bolts, clamping by means of clamping plates and screws, or the direct screw connection into welded-on brackets lead to a high initial load in the axle cross section.

If there is an insufficient positively locking connection of the metal strips or the bracket in the vehicle longitudinal direction or in the vertical direction in the case of welded-on brackets, this results in an increased load of the tack points or welded seams.

Welded seams can have unfavourable shapes and transitions, the result of which can be an undesired excessive stress increase.

In addition, fusion defects or root defects can occur in fusion welds owing to production. These can have a negative effect on the load-bearing capability of the axle cross section, in particular in the highly loaded region of the welded seam beginning and the welded seam end.

In the case of a design by means of the finite element method and service life estimations, the abovementioned production-induced variations make it difficult to make a prognosis. In experimental fatigue stress assessment, the abovementioned production-induced variations have a negative effect on the service life which is to be established statistically, since a relatively high risk factor has to be taken into consideration in the case of greatly varying results.

US 2008/0001379 A1 discloses an assembly system for an axle housing. At least one holding component is arranged between an upper and a lower region of a hollow arm of the axle housing.

DE 10 2006 017 421 A1 discloses an assembly system which is of similar configuration to the assembly system which is disclosed in US 2008/0001379 A1.

U.S. Pat. No. 5,855,416 A discloses a round sleeve in the interior of a round axle beam in the region of a brake flange.

U.S. Pat. No. 2,569,452 A discloses an axle beam, in the case of which a round axle tube is pushed partially into an axle beam in the region of a brake flange.

The present disclosure seeks to address the shortfall of the known methods and assemblies.

SUMMARY

The present disclosure is based on the object of providing an improved axle beam and a corresponding production method. The improved axle beam is to have, in particular, an improved load-bearing capability.

The axle beam is configured, in particular, as an axle bridge for a motor vehicle, preferably a commercial vehicle. The axle beam has a first axle beam shell and a second axle beam shell which is connected, in particular welded, to the first axle beam shell in order to configure a tubular body. The tubular body has an inner circumferential face with a plurality of flat sections which form a non-round cross section of the tubular body. In addition, the axle beam has a reinforcing component which has a non-round cross section, is inserted within the tubular body, and bears at least partially against the flat sections of the inner circumferential face of the tubular body.

If chassis attachments, for example brackets, strips, U-bolts or clamping plates, are attached to the axle beam shells, the reinforcing component reduces the variation in rigidity. Therefore, the local loading of the axle beam shells can be reduced at the connecting edges and, in particular, the welded seams. The forces and moments which result from external loads, for example in a manner introduced at the tread shuffle, load the load-bearing axle beam shells at the highly loaded chassis attachment. Since the section modulus rises as a result of the cross section increase by way of the reinforcing component, the loading of the cross section also drops.

The reinforcing component can be arranged and/or held, in particular, in a positively locking manner in the tubular body.

The reinforcing component can be configured, in particular, as a solid body formed from a single material.

The tubular body can have, in particular, a closed profile (hollow profile), in particular a rectangular profile.

The axle beam can be configured, in particular, as a hollow arm of an axle bridge for chassis attachment.

In one development, the reinforcing component is at least partially spaced apart from the inner circumferential face, in particular from transitions between the flat sections of the inner circumferential face of the tubular body. A defined spacing of this type improves the assembly capability, since a positively locking connection would scarcely be possible without complex reworking on account of the tolerance chain during the manufacture of the axle beam shells and the reinforcing component.

In one embodiment, the reinforcing component has a plurality of flat sections which are arranged, in particular, at an angle with respect to one another. The flat sections of the reinforcing component bear against the flat sections of the inner circumferential face of the tubular body. Transitions between the flat sections of the reinforcing component are spaced apart from transitions between the flat sections of the inner circumferential face of the tubular body. The flat sections can therefore ensure a positively locking connection between the reinforcing component and the tubular body, whereas the transitions compensate for the manufacturing tolerances.

In a further development, the transitions are configured as radii. The radii of the transitions between the flat sections of the inner circumferential face of the tubular body are smaller than the corresponding radii of the transitions between the flat sections of the reinforcing component. As a consequence, the manufacturing tolerances can be compensated for between the radii.

In another embodiment, the reinforcing component is configured in one piece. As an alternative, the reinforcing component has a plurality of parts which, in particular, bear loosely against one another or are connected to one another, are preferably welded or adhesively bonded.

In a further embodiment, the reinforcing component has an open profile, in particular a U-profile, an L-profile, an I-profile, an F-profile or a W-profile. In particular, only some of the flat surfaces of the inner circumferential face of the tubular body can be contacted by way of open profiles. The said flat sections are, in particular, those flat sections which are arranged close to welded seams of the tubular body and/or components for chassis attachment of the axle beam.

As an alternative, the reinforcing component can have a closed profile (hollow profile), in particular a rectangular profile. This can have the advantage that all the flat sections of the inner circumferential face of the tubular body can be contacted at least partially by the reinforcing component for supporting purposes.

In a further embodiment, a welded seam which connects the first axle beam shell and the second axle beam shell is additionally in contact with the reinforcing component in order to fasten the reinforcing component to the tubular body.

In one embodiment, one or a plurality of fastening means, in particular a screw, a bolt and/or an adhesive, fastens/fasten the reinforcing component to the tubular body. The bolt can be configured, for example, with a thread or without a thread and/or as a centre bolt.

In a further exemplary embodiment, the tubular body has an opening, through which the fastening means extends.

In yet a further exemplary embodiment, a seal is arranged between the reinforcing component and the tubular body in a region around the fastening means, the seal being configured, in particular, as an adhesive bead of an adhesive. The seal can prevent an outlet of oil from the opening for the fastening means. If the seal is configured as an adhesive bead, the seal can additionally fasten the reinforcing component to the tubular body.

In one design variant, the reinforcing component has an increased wall thickness in the region of a seat for the fastening means. In this way, loading of the reinforcing component can be reduced, in particular, at the location of the fastening.

In one a further design variant, the fastening means additionally fastens a chassis component to the axle beam. In this way, a direct attachment can take place between a chassis component, the tubular body and the reinforcing component in order to improve the load distribution.

In yet a further design variant, the reinforcing component is arranged completely within the tubular body with regard to a longitudinal axis of the tubular body.

As an alternative or in addition, the reinforcing component is arranged completely (with regard to the longitudinal axis of the tubular body and a radial direction with regard to the longitudinal axis of the tubular body) within the tubular body. In this way, the reinforcing component preferably serves only to support the tubular body and can accordingly be of functionally optimized design.

In a further embodiment, the reinforcing component has at least one projection which is configured, in particular, as a bracket for chassis attachment. The projection extends radially with regard to a longitudinal axis of the tubular body toward the outside through an opening in the tubular body. The opening can be configured, in particular, by the first axle beam shell, the second axle beam shell and/or both the first axle beam shell and the second axle beam shell. In this way, the reinforcing component can be used directly for attaching to the chassis.

In a further embodiment, the axle beam has a fastening region for chassis attachment. The reinforcing component is configured (and arranged) for supporting the fastening region and/or for reinforcing (stiffening) the tubular body. This can advantageously be, in particular, during downward clamping of the tubular body and the fastening region, by means of U-bolts, for example, since a deformation of the tubular body is counteracted. As an alternative or in addition, the reinforcing component projects beyond the fastening region along a longitudinal axis of the axle beam (tubular body) and/or a transverse axis of the axle beam (tubular body). The reinforcing component preferably has a continuously decreasing wall thickness in one or both end regions of the reinforcing component (in particular, along the longitudinal axis and/or the transverse axis of the tubular body). This can prevent, in particular, variations in rigidity.

The longitudinal axis of the tubular body can extend transversely (perpendicularly) with respect to the longitudinal axis of the motor vehicle (vehicle longitudinal direction) and, in particular, parallel to the transverse axis of the motor vehicle (vehicle transverse direction).

The transverse axis of the tubular body can extend perpendicularly with respect to the longitudinal axis of the tubular body.

The fastening region can be configured, for example, as a bracket, as a metal strip for positively locking chassis attachment and/or as another chassis attachment.

The present disclosure also relates to a motor vehicle, in particular a commercial vehicle, having an axle beam as disclosed herein.

The present disclosure likewise relates to a method for producing an axle beam as disclosed herein. The method comprises the inserting of the reinforcing component into the first axle beam shell. Subsequently, the method comprises pressing together and joining of the first axle beam shell and the second axle beam shell, a positively locking connection being brought about between the reinforcing component and the first axle beam shell and/or the second axle beam shell.

In one development of the method, the reinforcing component is designed in such a way that, during the pressing together, it is deformed substantially only at the transitions between the flat sections of the reinforcing component with retention of a flat contact between the flat sections of the reinforcing component and the flat sections of the inner circumferential face of the tubular body.

In a further development, the method comprises, furthermore, the providing, in particular drilling or milling, of a seat for the fastening means in the reinforcing component after the joining of the first axle beam shell and the second axle beam shell, the positively locking connection preferably holding the reinforcing component during the providing of the seat.

BRIEF DESCRIPTION OF THE DRAWINGS

The above-described embodiments and features of the present disclosure can be combined with one another in any desired way. Further details and advantages of the present disclosure will be described in the following text with reference to the appended drawings, in which.

Figure 1:
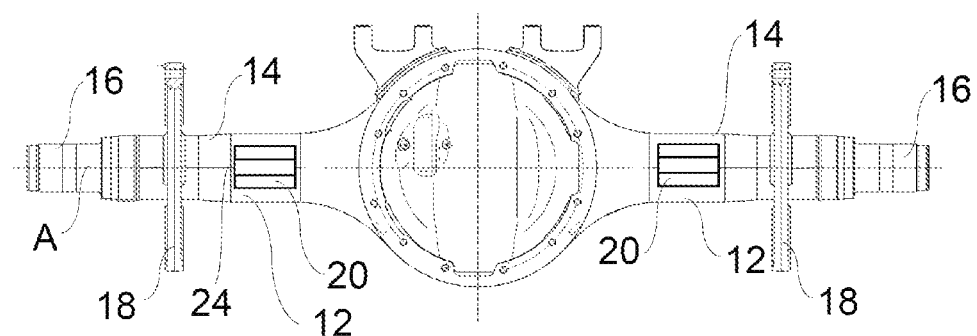
FIG. 1 shows an axle beam of a commercial vehicle.

The embodiments which are shown in the figures correspond at least partially, with the result that similar or identical parts are provided with the same reference numerals, and reference is also made to the description of the other embodiments and/or figures in order to describe them, so as to avoid repetitions.

DETAILED DESCRIPTION

FIG. 1 shows an axle beam 10. The axle beam 10 is configured as an axle bridge of a commercial vehicle. The commercial vehicle can be, for example, a lorry or an omnibus.

Each side of the axle beam 10 has a first (lower) axle beam shell 12, a second (upper) axle beam shell 14 and an axle stub 16. The first and second axle beam shells 12 and 14 are configured, in particular, as axle beam half shells. The first axle beam shell 12 and the second axle beam shell 14 are connected to one another, in particular welded, along a longitudinal axis A of the axle beam 10. The axle stub 16 is joined, in particular welded, to one end of the axle beam shells 12 and 14 which are connected to one another. A brake flange 18 of a disc brake or drum brake can be welded to the axle beam 10. A stub shaft (not shown) can extend through the axle beam 10.

The axle beam 10 is connected to a chassis (not shown) of the motor vehicle, for example, via a welded bracket 20. To this extent, the bracket 20 serves as a fastening region for chassis attachment of the axle beam 10. As an alternative, other chassis attachments can be used. For example, metal strips can be welded onto the axle beam. A positively locking chassis attachment can be made possible via the metal strips. Possibilities for chassis attachment are known in the prior art and are therefore not described in greater detail here. The chassis attachment can take place, for example, by means of U-bolts or clamping by way of clamping plates. It is also possible to provide a direct attachment to a chassis component.

Figure 2A:
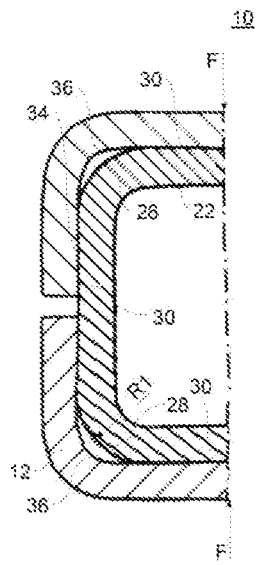
FIGS. 2A, 2B, and 2C show a cross section through an axle beam, which cross section shows a plurality of embodiments.
Figure 2B:
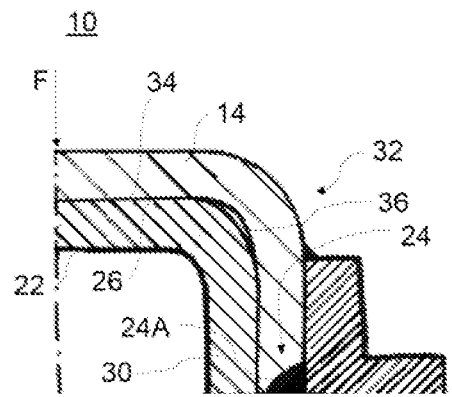
Figure 2C:
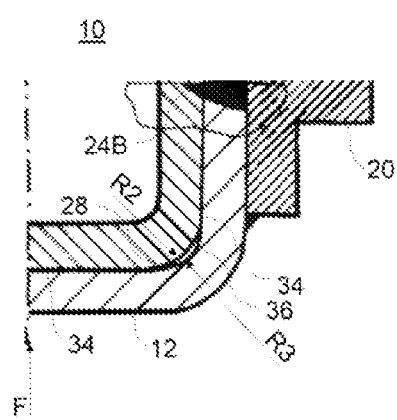

FIGS. 2A-2C show a cross section through the axle beam 10 in a first embodiment. The sectional plane lies perpendicularly with respect to the longitudinal axis A in the region of the bracket 20. The cross section which is shown shows a cross section before the joining of the axle beam shells 12 and 14 on the left hand side (FIG. 2A). On the right hand side, a cross section after the joining of the axle beam shells 12 and 14 and with a bracket 20 which has been welded on is shown (FIGS. 2B-2C).

Before the joining (left hand side in FIG. 2A), a reinforcing component 22 is inserted into the first axle beam shell 12. As shown, the reinforcing component 22 can be configured in one piece. It is also conceivable that the reinforcing component 22 is configured in multiple pieces. In the case of a plurality of pieces, the individual pieces can bear against one another loosely or can be connected to one another, for example adhesively bonded or welded. In the embodiment which is shown, the reinforcing component 22 has a closed hollow profile in the form of a rectangle. Other, in particular open profile shapes are also conceivable, however, as is explained later by way of example with reference to FIGS. 3A to 5B.

The reinforcing component 22 serves to reinforce the axle beam 10 in the region of the chassis attachment, that is to say, for example, in the region of the bracket 20. In detail, the axle beam 10 can be supported, which axle beam 10 is loaded by way of downward clamping of an axle cross section of the axle beam for the assembly of the chassis attachment by means of U-bolts, clamping by means of clamping plates and screws, or the direct screwed connection into the welded-on bracket 20.

The reinforcing component 22 has an outer contour which corresponds approximately to an inner contour of the axle beam shells 12 and 14 which are joined to one another.

After the reinforcing component 22 is inserted into the first axle beam shell 12, the first axle beam shell 12 and the second axle beam shell 14 are connected to one another. In particular, the axle beam shells 12 and 14 can be connected by way of a welded seam 24. During the joining process, the axle beam shells 12 and 14 are pressed against one another with a force F. The two axle beam shells 12, 14 form a tubular body 32.

The reinforcing component 22 is dimensioned in such a way that as far as possible all outer sides of the reinforcing component 22 make contact with an inner circumferential face 26 of the axle beam 10 by way of the pressing together of the axle beam shells 12, 14. During the pressing together, the reinforcing component 22 can deform. A deformation of the reinforcing component 22 takes place substantially in the region of the corner radii. The corner radii form transitions 28 between rectilinear (flat) sections 30 of the reinforcing component 22. In detail, the corner radii are reduced. For example, the corner radius R1 becomes a corner radius R2 during pressing together of the axle beam shells 12 and 14. The corner radii R1 and R2 are greater than an inner radius R3 of the inner circumferential face 26.

After the joining of the two axle beam shells 12 and 14, a positively locking connection in cross section is produced between the two axle beam shells 12, 14 and the reinforcing component 22. In detail, the flat sections 30 of the reinforcing component 22 bear against flat sections 34 of the inner circumferential face 26. In the region of the transitions 28, the reinforcing component 22 is spaced apart from corresponding transitions 36 of the inner circumferential face 26. It has been discovered that a positively locking connection, in the case of which the corner radii are spaced apart from one another, is to be preferred on account of the tolerance chain during the manufacture of the axle beam shells 12, 14 and the reinforcing component 22 and the joining method between the axle beam shells 12, 14.

As a result of the flat sections 34 of the inner circumferential face 26 which are arranged at an angle, the tubular body 32 has a non-round (non-circular) cross section. As a result of the flat sections 30 which are arranged at an angle, the reinforcing component 22 likewise has a non-round (non-circular) cross section.

The welded seam 24 can be provided in such a way that it connects merely the axle beam shells 12 and 14 (see welded seam section 24A in FIG. 2 by way of example). The welded seam 24 can also be provided, however, in such a way that it additionally fastens the reinforcing component 22 to the tubular body 32 (the axle beam shells 12, 14) (see welded seam section 24B in FIG. 2 by way of example).

If, for example, a bracket 20 or metal strips is/are welded or U-bolts, clamping plates or other chassis attachments are attached to the tubular body 32, the variation in rigidity is reduced by way of the reinforcing component 22. As a consequence, the local loading of the axle beam shells 12, 14 at bearing edges and the welded seam 24 is reduced.

The reinforcing component 22 can protrude beyond the chassis attachment (the fastening region of the chassis attachment), in particular, along the longitudinal axis A of the axle beam 10. Here, the reinforcing component 22 is preferably still arranged completely within the tubular body 32 with regard to the longitudinal axis A.

In one advantageous development, the reinforcing component 22 has a continuously (constantly) tapering portion (end region) with regard to the longitudinal axis A (not shown). In other words, the reinforcing component 22 has one or two end regions, at which a wall thickness of the reinforcing component 22 decreases continuously. This can prevent further variations in rigidity.

Figure 3A:
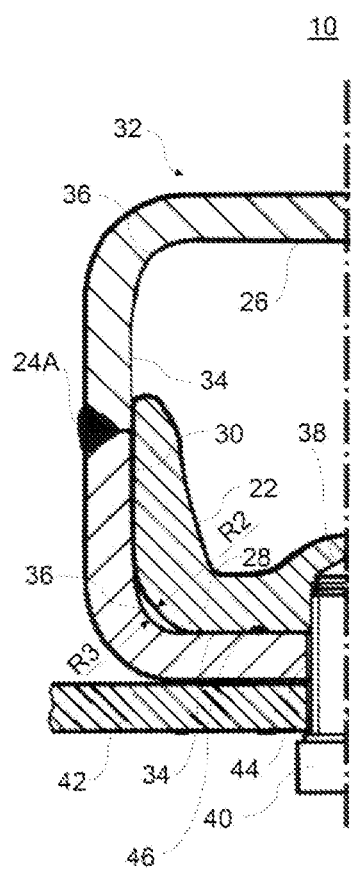
FIGS. 3A and 3B show a cross section through an axle beam, which cross section shows a plurality of embodiments.
Figure 3B:
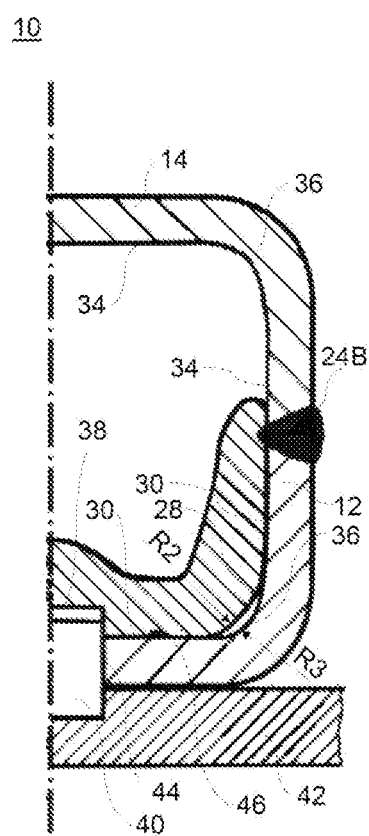
Figure 4A:
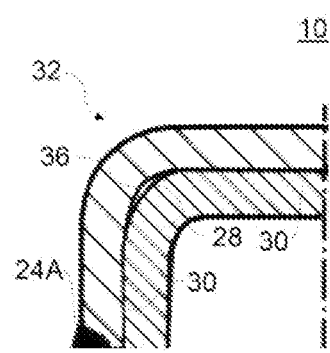
FIGS. 4A, 4B, and 5A show a cross section through an axle beam, which cross section shows a plurality of embodiments.
Figure 4B:
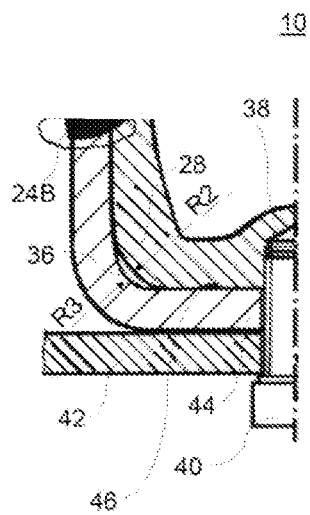

FIGS. 3A-3B show two further exemplary embodiments with a direct attachment of the tubular body 32 to a chassis component 42. The reinforcing component 22 has again been inserted into one of the axle beam shells 12 or 14 before the joining of the axle beam shells 12, 14.

The left hand side of the cross section in FIG. 3A shows an embodiment, in which the welded seam 24A connects the first and second axle beam shell 12, 14 to one another. The welded seam 24A does not connect the reinforcing component 22 to the axle beam shells 12, 14. The reinforcing component 22 can be adhesively bonded, for example, in the first axle beam shell 12. In the assembled state, the first axle beam shell 12 can be an upper or lower axle beam shell.

The right hand side of the cross section in FIG. 3B shows an example, in which the welded seam 24B connects the first and second axle beam shell 12, 14 and the reinforcing component 22 to one another.

In FIGS. 3A-3B, the reinforcing component 22 is configured as an open profile. In detail, the reinforcing component has a W-profile, with an increased wall thickness in the middle limb in the region of a seat 38 for a fastening means 40. In other embodiments, depending on the requirement, the reinforcing component can have another open profile, for example an I-profile, an L-profile or a U-profile.

The fastening means 40 can be configured, for example, as a screw (left hand side in FIG. 3M or a bolt, for example a centre bolt (right hand side in FIG. 3B). The fastening means 40 can extend through an opening 44, for example a bore, in the tubular body 32 into the seat 38. The fastening means 40 can connect the reinforcing component 22 to the tubular body 32 and/or the diagrammatically indicated chassis component 42.

The opening 44 and the seat 38 can be made, for example, by way of machining of the tubular body 32 and the reinforcing component 22. For example, the opening 44 and the seat 38 can be drilled. The seat 38 and/or the opening 44 can additionally have a thread for the fastening means 40. The machining preferably takes place in a state, in which the axle beam shells 12, 14 have already been connected to one another. A positively locking connection between the tubular body 32 and the reinforcing component 22 can hold the reinforcing component 22 in position during the machining. Secondly, for example, it is also possible that the reinforcing component 22 is held by way of the welded seam 24B and/or by way of an adhesive bond.

During operation, the tubular body 32 is filled with a lubricant, for example a lubricating oil. In order to prevent oil leaks through the opening 44, a seal 46 can be provided. The seal 46 surrounds the seat 38 and seals between the reinforcing component 22 and the tubular body 32. In one preferred embodiment, the seal 46 can be configured as an adhesive bead which additionally fastens the reinforcing component 22 to the tubular body 32.

Exemplary applications for an embodiment of this type are, for example, a direct screw connection of an air spring on the axle beam, a direct screw connection of a leaf spring, a positively locking connection to a chassis component, and a direct screw connection to an air bellows carrier.

A weight-optimized construction is possible by way of the direct connection of the chassis component 42. In addition, additional components and assembly steps can be saved. The direct attachment makes it possible, in addition, to dispense with welded seams for welding on brackets or metal strips. The direct attachment additionally makes a positively locking connection via a defined external dimension of the axle cross section unnecessary.

A direct attachment of a chassis component can also take place on a plurality of outer sides of the tubular body 32.

In one embodiment with an open profile of the reinforcing component 22, as shown in FIG. 3, for example, the reinforcing component 22 can deform or not deform during the pressing together of the axle beam shells 12, 14. If a deformation takes place, this occurs predominantly in the region of the transitions 28 between the flat sections 30 as in the case of the embodiment which is described with reference to FIG. 2.

In the embodiment (shown in FIG. 3) with an open profile of the reinforcing component 22, the reinforcing component 22 additionally has continuously (constantly) tapering portions (end regions) with regard to a transverse axis of the tubular body 32, which transverse axis runs perpendicularly with respect to the longitudinal axis A.

FIGS. 4A-5A show two further embodiments with a direct attachment to a chassis component. The reinforcing component 22 has again been inserted into one of the axle beam sheik before the joining of the axle beam shells 12, 14.

The left hand side shows an embodiment, in which the reinforcing component 22 has a closed profile as in the case of the embodiment of FIG. 2A. In addition, the embodiment on the left hand side in FIG. 4A has a thickened wall region for the introduction of the seat 38 for the fastening means 40.

The right hand side shows an embodiment, in which the reinforcing component extends outside the tubular body 32. In detail, the reinforcing component 22 has a projection 48. The projection 48 extends in a radial direction with regard to the longitudinal axis of the axle beam 10 (see longitudinal axis A in FIG. 1). The projection 48 can be fastened to an outer circumferential face of the tubular body 32 by way of a welded seam 50, for example a circumferential welded seam. As in the case of the bracket 20 of the embodiment of MG. 2B, chassis components can be attached to the projection 48.

The projection 48 extends through an opening 52 in the tubular body 32.

Figure 5A:
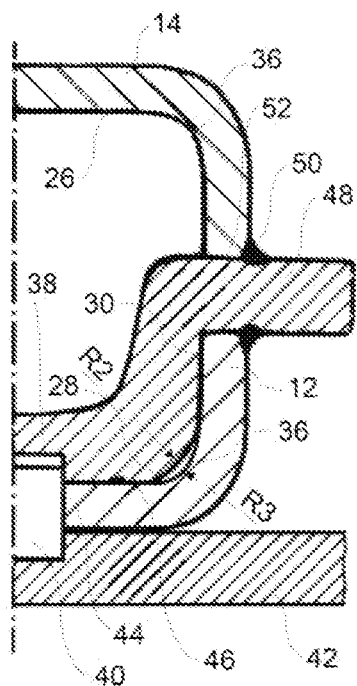
Figure 5B:
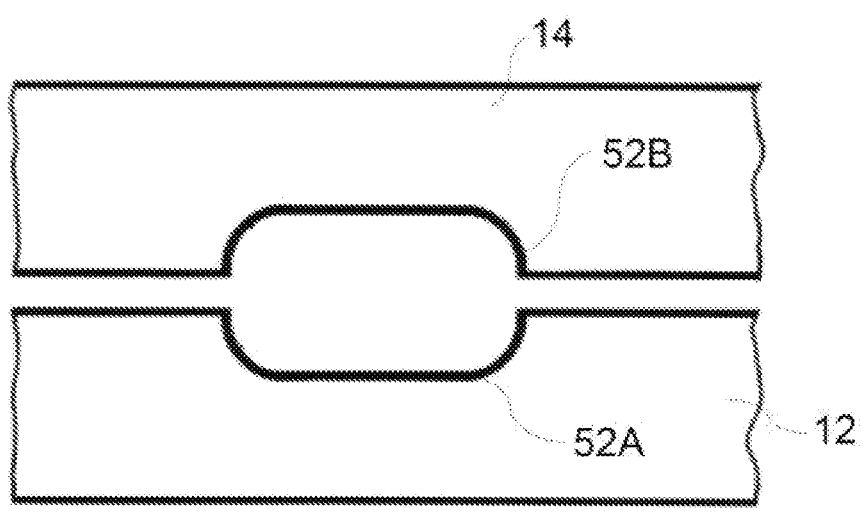
FIG. 5B shows a plan view of two axle beam shells before the axle beam shells are joined.

FIG. 5B shows how the opening 52 can be provided in the axle beam shells 12, 14. FIG. shows the axle beam shells 12, 14 before the joining. In each case one recess 52A, 52B is, for example, milled into the two axle beam shells 12, 14, The two recesses (pockets) 52A and 52B result in the opening 52 after the joining of the axle beam shells 12, 14. It is likewise possible that the opening 52 is configured only by way of one of the two axle beam shells 12, 14.

In the assembled state which is shown in FIGS. 4A-5A, a load introduction which results from an assembly prestress and operational loading into the projection 48 does not act directly on the axle beam shells 12, 14. The load path is divided among the wall of the tubular body 32 in the region of the opening 52 and the positively locking contact between the reinforcing component 22 and the tubular body 32. The variation in rigidity at the projection 48 which serves as a bracket is minimized for the axle beam shells 12, 14. This also applies to the outer welded seam 50 which is subjected to a lower load.

As FIG. 5A shows, the embodiment with the projection 48 can also be combined with a direct attachment to the chassis component 42.

Experts will recognize that individual features of the embodiments which are described herein can be combined with one another. To this extent, all of the features of the embodiments are disclosed herein as being independent of one another, with the result that a combination of individual features and/or an omission of individual features are/is possible, as long as no inconsistencies arise. For example, all of the embodiments can have a connecting component with continuously tapering end regions and/or can be used for direct attachment to a chassis component.

The present disclosure is not restricted to the above-described preferred exemplary embodiments. Rather, a multiplicity of variants and modifications are possible which likewise use the concept of the present disclosure and therefore fall within the scope of protection.

LIST OF REFERENCE NUMERALS

10 Axle beam (axle bridge)
12 First axle beam shell
14 Second axle beam shell
16 Axle stub
18 Brake flange
20 Bracket
22 Reinforcing component
24 Welded seam
24A Welded seam between the first and the second axle beam shell
24B Welded seam between the first axle beam shell, the second axle beam shell and the reinforcing component
26 Inner circumferential face
28 Transition
30 Flat section
32 Tubular body
34 Flat section
36 Transition
38 Seat
40 Fastening means
42 Chassis component
44 Opening
46 Seal
48 Projection
50 Welded seam
52 Opening
52A First recess
52B Second recess
A Longitudinal axis of the axle beam
R1 Radius at the transition before the joining of the axle beam shells
R2 Radius at the transition after the joining of the axle beam shells
R3 Radius at the transition (after the joining of the axle beam shells)

We claim:

1. An axle beam for a motor vehicle comprising:
a first axle beam shell;
a second axle beam shell connected to the first axle beam shell to configure a tubular body, the tubular body having an inner circumferential face with a plurality of rectilinear sections which form a non-round cross section of the tubular body; and
a reinforcing component which has a non-round cross section, is inserted within the tubular body, and bears at least partially against the rectilinear sections of the inner circumferential face of the tubular body,
wherein the reinforcing component has an open profile, selected from the group consisting of a U-profile and a W-profile.

2. The axle beam according to claim 1, wherein the axle beam is an axle bridge.

3. The axle beam according to claim 1, wherein the second axle beam shell is welded to the first axle beam shell.

4. The axle beam according to claim 1, wherein the reinforcing component is radially spaced apart at least partially from the inner circumferential face along transitions between the rectilinear sections of the inner circumferential face of the tubular body.

5. The axle beam according to claim 1, wherein:
the reinforcing component has a plurality of rectilinear sections which are arranged at an angle with respect to one another;
the rectilinear sections of the reinforcing component bearing against the rectilinear sections of the inner circumferential face of the tubular body; and
transitions between the rectilinear sections of the reinforcing component being spaced apart from transitions between the rectilinear sections of the inner circumferential face of the tubular body.

6. The axle beam according to claim 4, wherein:
the transitions are configured as radii (R1, R2, R3); and
the radii (R3) of the transitions between the rectilinear sections of the inner circumferential face of the tubular body being smaller than the corresponding radii (R1, R2) of the transitions between the rectilinear sections of the reinforcing component.

7. The axle beam according to claim 1, wherein:
the reinforcing component is configured in one piece.

8. The axle beam according to claim 1, further comprising:
a welded seam which connects the first axle beam shell and the second axle beam shell being additionally in contact with the reinforcing component in order to fasten the reinforcing component; or
one or a plurality of fastening means, selected from the group consisting of a screw, a bolt and an adhesive fastening the reinforcing component to the tubular body.

9. The axle beam according to claim 8, wherein:
the tubular body has an opening, through which the fastening means extends; or further comprising:
a seal arranged between the reinforcing component and the tubular body in a re-gion around the fastening means, the seal being configured as an adhesive bead of an adhesive.

10. The axle beam according to claim 8, wherein:
the reinforcing component has an increased wall thickness in the region of a seat for the fastening means; or
the fastening means additionally fastens a chassis component to the axle beam.

11. The axle beam according to claim 9, wherein:
the reinforcing component is arranged completely within the tubular body.

12. The axle beam according to claim 1, wherein the reinforcing component has at least one projection which is configured as a bracket for the chassis attachment, the projection extending axially relative to a longitudinal axis (A) of the tubular body toward an outside of the tubular body through an opening in the tubular body, and the opening being formed by the first axle beam shell, the second axle beam shell or both the first axle beam shell and the second axle beam shell.

13. The axle beam according to claim 1, wherein the axle beam includes a fastening region for a chassis attachment; and
the reinforcing component is configured in order to support the fastening region or in order to reinforce the tubular body; or
the reinforcing component projecting beyond the fastening region along a longitudinal axis (A) or transverse axis of the axle beam, and having a continuously decreasing wall thickness in one or both end regions of the reinforcing component.

14. A method for producing an axle beam, comprising:
inserting a reinforcing component into a first axle beam shell;
pressing together and joining the first axle beam shell and a second axle beam shell; and
positively locking the reinforcing component and the first axle beam shell or the second axle beam shell; and
deforming the reinforcing component during the pressing together, substantially only at transitions between rectilinear sections of the reinforcing component with the retention of a planar contact between the rectilinear sections of the reinforcing component and rectilinear sections of an inner circumferential face of the tubular body; or
providing, by drilling or milling, of a seat for a fastening means in the reinforcing component after the joining of the first axle beam shell and the second axle beam shell.

15. The method according to claim 14, further comprising:
a positively locking connection holding the reinforcing component during the providing of the seat.

16. An axle beam for a motor vehicle comprising:
a first axle beam shell;
a second axle beam shell connected to the first axle beam shell to configure a tubular body, the tubular body having an inner circumferential face with a plurality of rectilinear sections which form a non-round cross section of the tubular body; and
a reinforcing component which has a non-round cross section, is inserted within the tubular body, and bears at least partially against the rectilinear sections of the inner circumferential face of the tubular body,
wherein the reinforcing component has at least one projection which is configured as a bracket for a chassis attachment, the projection extending axially relative to a longitudinal axis of the tubular body toward an outside of the tubular body through an opening in the tubular body, and the opening being formed by the first axle beam shell, the second axle beam shell or both the first axle beam shell and the second axle beam shell.

* * * * *